May 5, 1959

N. JOHN REES 2,885,190

KILN COOLER

Filed Jan. 2, 1957

INVENTOR
N. John Rees
BY
ATTORNEY

May 5, 1959     N. JOHN REES     2,885,190
KILN COOLER
Filed Jan. 2, 1957     2 Sheets-Sheet 2
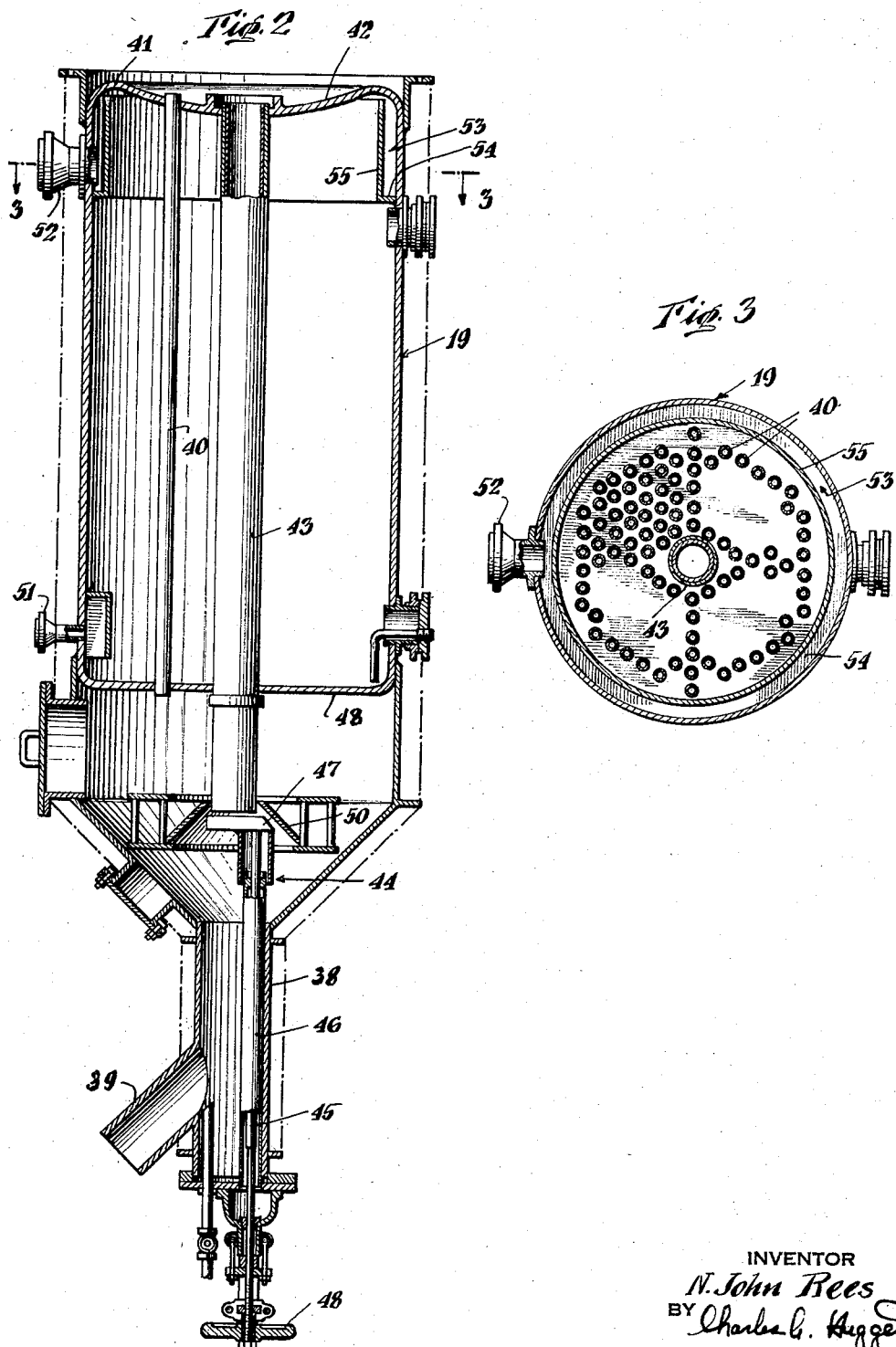
INVENTOR
N. John Rees
BY Charles G. Huggett
ATTORNEY United States Patent Office 2,885,190
Patented May 5, 1959

2,885,190

KILN COOLER

N. John Rees, Bayside, N.Y., assignor to Socony Mobil Oil Company, Inc., a corporation of New York Application January 2, 1957, Serial No. 632,133

2 Claims. (Cl. 257—224)

This invention relates to an improvement in a heat exchanger for adjusting the temperature of a hot granular contact material which is passed therethrough as a compact gravitating stream. The invention more particularly relates to an improvement in a catalyst cooler for use in a moving bed hydrocarbon conversion process.

In the TCC system for the manufacture of motor fuel a granular contact material is passed as a compact gravitating bed downwardly through a reaction zone where it is contacted with hydrocarbons and downwardly as a compact gravitating bed through a regenerator or kiln where the spent contact catalyst is regenerated by burning to thereby provide fresh catalyst for use in the reaction zone. The reactions occurring in the reaction zone are generally endothermic whereas, the combustion occurring in the regeneration zone is exothermic. It is desirable to provide a balance in the system whereby the catalyst is supplied to the reaction zone at that advanced temperature necessary to provide the heat of reaction. Since the exothermic reaction generally provides more heat than is required in the reaction zone, it is necessary to continuously extract at least a certain amount of heat from the system. This is generally done by the use of endothermic heat exchange fluid either in cooling tubes passed through the regenerator or in separate heat exchangers through which the catalyst is passed after leaving the regenerator.

The temperature is generally maintained in the reaction zone at about 800 to 1100° F. and it is customary to maintain the pressure in this zone advanced so as to provide for ready transfer of the reactants through the processing system. The pressure is generally in the neighborhood of 10 to 20 pounds per square inch. Hydrocarbons properly prepared for treatment are introduced into one end of the reactor and pass through the gravitating bed of catalyst in the zone for a period of time sufficient to effect conversion to the desired products. The desired products are then removed from the other end of the reaction zone and passed on to further processing apparatus. A carbonaceous contaminant is deposited on the catalyst during its passage through the reactor which impairs the cracking ability of the catalyst. Furthermore, during passage through the reactor, the temperature of the catalyst drops. It is, therefore, necessary to remove the contaminant by burning to both restore the cracking ability of the catalyst and to bring the temperature of the catalyst back to the desired high level.

The catalyst is transferred from the bottom of the reactor to the top of the kiln and is passed downwardly through the kiln as a compact mass. Air is introduced into the kiln to pass through the voids in the catalyst bed and burn the contaminants from the catalyst. The temperature in the kiln is controlled at about 1000 to 1300° F. and the pressure in the kiln is generally maintained at just slightly in advance of atmospheric pressure. The catalyst is withdrawn from the bottom of the kiln in regenerated form at a temperature somewhat higher than desired in the reactor. This catalyst is then gravitated in compact form through a heat exchanger where a sufficient amount of heat is extracted from the catalyst so that the catalyst, when transferred from the heat exchanger to the reactor, will arrive at the reactor at the desired temperature.

Various types of granular catalytic material have been used in the past, such as natural or treated clays, for example, bentonite, montmorillonite and kaolin. Furthermore, various synthetic associations have been used as catalytic material, such as silica, silica-alumina, silica-molybdena, with or without various additional catalytic materials impregnated or associated with the base materials. Various particle sizes have been used in the TCC and related processes, a suitable size range being 4 to 12 mesh by Tyler screen analysis.

Extensive design work has been done in the past in an effort to design and construct suitable trouble-free heat exchangers for use in the TCC and related processes. In the early design of the TCC system, indirect heat exchanger pipes were passed through the kiln and a molten salt was used as the cooling medium. This proved to be corrosive, causing rapid deterioration of the pipes with the result that the catalyst was flooded with the corrosive salts. Water under pressure was later used as a cooling medium in the heat exchanger pipes. Because the cooling load varies in a system of this type, making it necessary at sometimes to extract more heat from the catalyst than at others to maintain heat balance, some pipes had to be taken out of service in order to provide temperature adjustment. It was found that when these pipes were put back into service that failure of the pipes often occurred with the result that water under pressure was forced into the regenerator, causing damage to the catalyst. The pipes when not in service became heated to the catalyst temperature level, such as, for example, 1200° F. The shock proved too great when water at 200–300° F. was charged to these hot pipes, causing metal failure. In order to overcome this difficulty, therefore, a separate cooler was designed for use below the kiln in which a series of vertical catalyst transfer pipes were arranged through the body of the cooler to transfer continuously compact streams of the catalyst. A central by-pass pipe of substantially larger cross-section was provided through the cooler with a valve means located at the lower end of this by-pass pipe to effectively control the flow rate of catalyst through the by-pass pipe. This cooler provided for the maintenance of a constant flow rate of catalyst through the cooler but provided for temperature adjustment of the catalyst as needed. Simply by varying the flow rate of catalyst through the by-pass pipe, the amount of heat extracted from the catalyst could be varied without changing the total flow rate of catalyst through the cooler. The design of the cooler permitted the catalyst transfer pipes to be kept in contact with cooling liquid at all times, thereby avoiding the sudden temperature changes encountered with the former systems. Since catalyst flow rate in a TCC system is an important control element in maintaining conditions in the reactor at maximum efficiency operation, it was important that the catalyst cooler provide the necessary temperature adjustment without altering catalyst flow rate.

While this cooler has operated satisfactorily in many installations, it has been found that some metal failures have occurred in the top wall of the cooler and particularly at the location where the vertical catalyst transfer pipes attach to the top wall of the cooler. It is believed that this failure has been caused by inadequate provision for assuring that the top wall of the cooler is at all times submerged in the cooling medium and particularly inadequate provision that the top wall of the cooler at the locations where the vertical transfer pipes connect to the top wall of the cooler is submerged in the cooling fluid at all times.

The object of this invention is to provide an improved cooler design which assures that the catalyst transfer pipes are at all times kept in contact with the cooling medium throughout their entire length.

A further object of this invention is to provide an improvement of the previously used cooler which will prevent failure of the cooler, such as described hereinabove.

Other and further objects of this invention will become obvious from reading the attached detailed description of the invention.

One aspect of this invention involves a cooler for continuously cooling a gravitating compact stream of hot catalyst in which the catalyst is passed through the cooler at a substantially constant total flow rate, but which provides for variable adjustment of the temperature of the catalyst, the cooler being a cylindrical vessel having a top wall and bottom wall, the top wall of the vessel being substantially depressed over a large portion of its total area, a series of substantially vertical catalyst transfer pipes passed through the cooler, the upper ends of these pipes being located within the depressed portion of the top wall of the cooler, a continuous trough located about the inner wall of the cooler at the upper end thereof with the top of the trough being located outside of the depressed portion of the top wall of the cooler and terminated just below the top of the cooler at a level elevationally above the connection of the upper ends of the transfer pipes with the top wall of the cooler and elevationally above substantially all of the depressed portions of the top wall of the cooler with means communicating with the interior of the trough for withdrawal of cooling fluid from the trough and at least one substantially vertical by-pass pipe of substantially larger cross-section than the catalyst transfer pipes also located within the depressed portion of the top wall of the cooler, and having associated with its lower end a mechanically operated valve adapted to control the flow rate of the catalyst through the by-pass pipe, whereby appropriate adjustment of the relative flow of catalyst through the by-pass pipe to that through the transfer pipes may be made for temperature control purposes.

Figure 2 is a view in vertical section of a cooler constructed according to the principles of the present invention;

Figure 3 is a view in plan as seen on section 3—3 of Figure 2.

Figure 1:
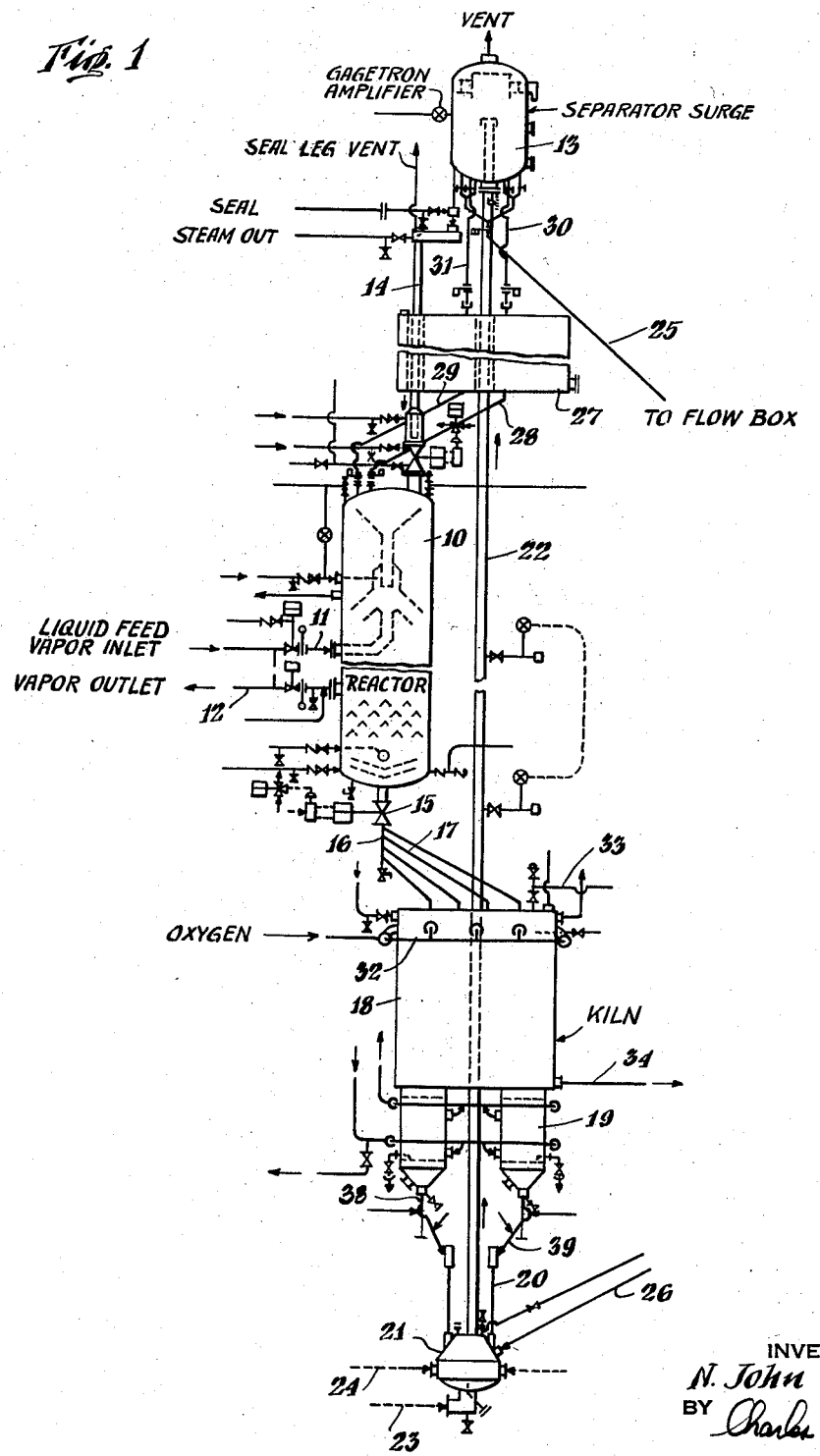
Figure 1 is a schematic view in elevation of a hydrocarbon conversion plant incorporating the improvements of the present invention.

In Figure 1 there is shown a portion of a TCC unit improved according to the present invention. Either liquid or vapor phase hydrocarbon material to be converted is supplied to a reactor 10 through inlet conduit 11 and the converted or cracked hydrocarbon products are withdrawn from the reactor 10 through conduit 12. Various other connections to and from the reactor are schematically shown in the interest of completeness but require no discussion for an understanding of this invention.

The reactor 10 is filled with a catalyst material of solid granular form and this material is a part of the compact moving bed that extends continuously from the separator 13 through conduit 14, the reactor 10, the conduit 15, manifold 16, four conduits 17, the kiln 18, coolers 19 and conduits 20 to a lift tank 21. The contact material entering lift tank 21 is pneumatically raised in the conduit 22 to the separator 13 in a stream of rapidly moving lift gas, generally in widely dispersed form.

Since the material gravitates as a continuous compact column from separator 13 to lift tank 21, it is apparent that the contact material flow rate is the same throughout the gravity flow regions of the system and that the rate of this movement is a function of the rate of withdrawal of material from the lower ends of conduits 20. It is highly important to the successful operation of the TCC system that the flow rate of catalyst through the reactor be maintained constant as well as the flow rate of oil to the reactor. This provides a so-called catalyst-to-oil ratio which is set at a value found to provide the desired products, and which must not be varied during operation of the unit.

While a valve is shown in conduit 14 and another valve 15 is shown below the reactor 10, it is to be understood that these are safety valves for emergency use and that they are open during normal operation of the system.

The exact chemical nature of the conversion taking place in the reactor 10 is not important to an understanding of the present invention except that it is important to note that the catalytic conversion of hydrocarbons is usually an endothermic reaction in which the uniformity of application of heat affects both the size and purity of the yield. The required heat is usually supplied, at least in part, by the catalyst and, for that reason, both the temperature and the uniformity of that temperature throughout the body of material flowing to and across the cross-section of the reactor is important. In cracking hydrocarbons the temperature in the reactor is usually about 800–1100° F. This, then, is the desired general range of temperature of the material flowing through the conduit 14 to the reactor 10 and uniformly present across the cross-section of the reactor.

At the bottom of the gravity column of the TCC unit of Figure 1, primary and secondary lift gas under pressure are admitted to the lift tank 21 to lift the contact material up the conduit 22. The primary lift gas is introduced at 23 and the secondary lift gas at 24. The lift gas so introduced into the system is removed in the separator 13 from which most of the contact material is returned to the reactor 10. Since, however, a system of the type shown requires a moving bed of fairly uniform granular particles, and since there is some breakage or attrition of contact material in the course of its cyclic recirculation, a small percentage of the contact material reaching separator 13 is drained from the separator through a conduit 25 which leads to an elutriator, not shown, in which fines are separated. From the elutriator the contact material purged of fines is returned to the system through the conduit 26. When it is desired to drain any portion of the system of catalyst, the catalyst can be stored temporarily in a hot storage bin 27 by passing the catalyst through conduits 30 and 31. These conduits are normally closed to catalyst flow. The temporarily stored catalyst can readily be returned to the system through the conduits 28, 29, which connect with the top of the reactor 10.

The kiln 18 is annular in cross-section. The conduits 17 discharge at circumferentially spaced points about the annulus in order to distribute the contact material evenly throughout the kiln and provide for uniform downward catalyst velocity at all locations across the kiln cross-section. The kiln 18 is supplied with air through a manifold ring 32. The flue gases are withdrawn at 33 and 34. The lift pipe 22 passes upwardly through the central hole in the kiln but there is no heat exchange between the lift pipe and the kiln.

The contaminant on the catalyst is a hydrocarbonaceous material which, when burned, provides a substantial amount of heat. In the case of catalysts contaminated by cracking hydrocarbons, temperatures, such as 1000–1300° F., are reached in the regenerator. While this is below the temperature at which the catalyst would be damaged, it is above the temperature required in the reactor 10. A sufficient amount of heat is, therefore, withdrawn from the catalyst so that when the catalyst arrives at the reactor it will have the proper temperature to provide the necessary heat in the reactor but no more than that desired. The amount of heat which must be removed varies from time to time and with changing conditions and, hence, any cooler for this use must be adapted for extracting variable amounts of heat from the catalyst to meet these changing conditions and yet, maintain heat balance in the system. The cooler must provide this changeable heat removal capacity without changing the flow rate of the catalyst therethrough, since the flow rate of catalyst through the cooler is also the flow rate of catalyst through the reactor. Any change in flow rate of catalyst through the reactor would upset the cracking operations occurring in the reactor and, hence, cannot be tolerated.

In order to cool a large volume of contact material to a particular temperature, and in order to insure that the cooling is uniform throughout the body of contact material leaving the coolers, it has been found that the design of the cooler is most important. These coolers may be either single large capacity units or smaller units in parallel. Four such coolers are employed in a system such as is shown in Figure 1.

The invention is shown in more detail in the Figures 2 and 3. Figure 2 shows a vertical longitudinal section of the cooler 19, and Figure 3 shows a plan view as seen on the horizontal plane 3—3 of Figure 2.

Referring now to Figure 2, there is shown a substantially vertical catalyst transfer pipe 40 passed vertically through the vessel with the upper end of the pipe terminated in the top wall 41 of the vessel and the lower end of the transfer pipe terminated in the bottom wall 48 of the vessel. It is understood that a plurality of these pipes are uniformly distributed across the vessel, as shown on Figure 3. It will be noted that the central portion of the top wall 41 is depressed in the region 42. The transfer pipes 40 are grouped within this depressed portion 42 of the top wall 41. Centrally located within the cooler 19 is a substantially vertical catalyst by-pass pipe 43. This by-pass pipe is much larger in cross-section than the vertical catalyst transfer pipes 40. Associated with the lower end of the vertical catalyst by-pass pipe 43 is a valve mechanism 44. This comprises a vertical shaft 45 in a vertical housing 46, having at its upper end a valve plate 47 and at its lower end a handwheel 48 for mechanically moving the valve plate 47. It is seen, therefore, that by adjustment of the handwheel 48, the valve plate 47 may be raised or lowered below the vertical by-pass pipe 43 to control and adjust the flow rate of the catalyst passing through the vertical by-pass pipe. The catalyst passed through the cooler is discharged from the bottom of the cooler 19 through the outlet conduit 38 and connecting conduit 39. Catalyst is passed in substantially compact form through the vertical catalyst transfer pipes 40 and continues as a gravitating column through the outlet pipe 38 and connecting conduit 39. Catalyst is passed as a compact stream through the vertical by-pass pipe to the valve plate 47. It drops from the valve plate in controlled free fall to recombine with the catalyst passing in compact flow from the vertical transfer pipes. A conical baffle 50 is provided around the lower end of the vertical by-pass pipe 43 and catalyst travelling from the bottom of the vertical catalyst transfer pipes is baffled around the exterior of the conical baffle 50, providing a free surface thereunder at the angle of repose of the catalyst which, for granular cracking catalyst, is about 30 degrees with the horizontal. This provides a free surface onto which the catalyst flowing from the lower end of the catalyst by-pass pipe can be recombined with the continuously gravitating column of catalyst through the cooler. By adjusting the position of the valve 44 to control the flow rate of catalyst through the by-pass pipe, the flow of catalyst through the vertical catalyst transfer pipes is automatically adjusted but in opposite amounts, so that the total catalyst passing through the cooler is at all times substantially constant. However, by changing the flow of catalyst through the by-pass pipe in relation to the flow of catalyst through the transfer pipes, the amount of heat extracted from the catalyst is altered. It is seen, therefore, that without changing the flow rate of catalyst through the cooler, more or less heat can be extracted from the catalyst merely by properly adjusting the valve 44 below the vertical catalyst by-pass pipe 43. A cooling fluid, preferably water under pressure, is introduced into the cooler through the conduit 51 attached to the lower end of said cooler. This supplies the cooling liquid to the lower end of the cooler and brings it into contact with the exterior of the vertical catalyst transfer pipes and the vertical by-pass pipe.

The cooling liquid or fluid is withdrawn from the upper end of the cooler through the coolant discharge pipe 52. When using water, it may be convenient to operate the cooler under advanced pressure and withdraw the cooling fluid at least partially in the form of steam.

Previous coolers of this general design had a flat head and it was found that where the vertical catalyst transfer pipes 40 connect with this head, fractures occurred which made it necessary to interrupt the operation of the system and repair the cooler at this location. This improved cooler design provides a depressed portion 42 of the top wall 41 of the cooler with the vertical transfer and by-pass pipes connected at their upper ends within the depressed portion of the top wall of the cooler. A circumferentially complete trough 53 is located at the upper end of the cooler and about the inner periphery of said cooler. This trough is made up of an annular floor 54 of substantially uniform radial thickness and a cylindrical baffle 55 attached at the inner edge of the annular floor 54 with its upper end terminated a short distance below the top wall 41 of the cooler, but at least substantially outside of the depressed portion 42 of the top wall 41 of the cooler. The upper edge of the trough 43 is thereby arranged elevationally above the connection of all the vertical catalyst transfer pipes and the by-pass pipe with the top wall of the cooler. This arrangement causes the cooling fluid to be withdrawn uniformly about the cooler into the trough and, further, causes the cooling fluid to be kept in flowing motion in contact with the top wall of the cooler at all times. By maintaining the cooling fluid flowing over the connections of the transfer pipes and the by-pass pipe with the top wall of the cooler, the temperature in these junctures is kept substantially constant and, therefore, the temperature stresses which caused the failures in the previous cooler are avoided. The cooling fluid or liquid within the trough is then withdrawn from the vessel through the coolant discharge pipe 52. By arranging the cylindrical baffle 55 not substantially below the top wall 41, there is provided a continuous annular aperture of restricted height which helps materially in providing uniform withdrawal of the cooling fluid about the periphery of the trough 53. This aids materially in providing a substantially uniform temperature across the top wall of the cooler, thereby preventing damaging stresses which caused failures in previous cooler designs.

The description of the invention given above is for illustrative purposes only. The only limitations on the invention are contained in the attached claims.

I claim:

1. An improved catalyst cooler for a moving bed hydrocarbon conversion system comprising: an upright cylindrical vessel, the top wall of said vessel being depressed a substantial amount over a substantial portion of its central area, substantially vertical catalyst transfer pipes passed through the vessel, said pipes being located at their upper ends within the depressed portion of the top wall, the outer periphery of said top wall being curved downwardly from a location of maximum elevation to merge with the upper end of the side wall of said cylindrical vessel, a continuous trough located about the inner periphery of said cylindrical vessel near the top thereof, the upper end of said trough terminated near the top wall of the vessel and at least substantially outside of the depressed portion of said wall and further substantially beneath and in alignment with the location of maximum elevation of said top wall, whereby all of the connections of the transfer pipes with the top wall and substantially all of the depressed portion of said wall are located elevationally below the upper end of said trough, a first conduit at the lower end of said vessel, for supplying cooling fluid to said vessel, a second conduit at the upper end of said vessel, for withdrawing cooling fluid from said vessel, said second conduit communicating with the trough in the upper end of the vessel, at least one substantially vertical catalyst by-pass pipe located within the depressed portion of the top wall of said cylindrical vessel and valve means associated with the lower end thereof for adjusting the relative flow of catalyst through the transfer pipes and the by-pass pipe, so as to provide the necessary cooling of the catalyst without change of total catalyst flow rate through the cooler.

2. Claim 1 further characterized in that the trough is formed by a floor of annular shape and uniform radial thickness and a cylindrical baffle located at the inner edge of said floor, the cylindrical baffle terminated a minor and uniform distance from the top wall of the upright vessel, whereby fluid is withdrawn into the top of the trough uniformly about the periphery thereof.

References Cited in the file of this patent

UNITED STATES PATENTS

| | | |
|---|---|---|
| 447,285 | Alberger | Mar. 3, 1891 |
| 1,918,966 | Harkness | July 18, 1933 |
| 2,557,356 | Little | June 19, 1951 |
| 2,655,347 | Bielfeldt | Oct. 13, 1953 |
| 2,772,076 | Matthews | Nov. 27, 1956 |

FOREIGN PATENTS

| | | |
|---|---|---|
| 297,509 | Great Britain | Sept. 27, 1928 |
| 758,030 | Great Britain | Sept. 26, 1956 |